United States Patent
Rixen et al.

(10) Patent No.: US 7,284,710 B2
(45) Date of Patent: Oct. 23, 2007

(54) HEATING SYSTEM

(75) Inventors: James M. Rixen, Portland, OR (US); Cristian Murgu, Coquitlam (CA)

(73) Assignee: NW Research & Development, Inc., Sandy, OR (US)

( * ) Notice: Subject to any disclaimer, the term of this patent is extended or adjusted under 35 U.S.C. 154(b) by 615 days.

(21) Appl. No.: 10/421,365

(22) Filed: Apr. 22, 2003

(65) Prior Publication Data

US 2003/0230633 A1    Dec. 18, 2003

Related U.S. Application Data

(60) Provisional application No. 60/375,123, filed on Apr. 22, 2002.

(51) Int. Cl.
F24H 3/06    (2006.01)
B60H 1/02    (2006.01)

(52) U.S. Cl. .................. 237/12.3 B; 237/2 A; 237/8 R; 237/12.3 C

(58) Field of Classification Search ........... 237/12.3 C, 237/12.3 B, 2 A; 165/41, 42
See application file for complete search history.

(56) References Cited

U.S. PATENT DOCUMENTS

| | | | |
|---|---|---|---|
| 2,661,015 A | 12/1953 | Allred et al. | |
| 2,894,265 A | 7/1959 | Reardon | |
| 2,975,797 A | 3/1961 | Matheney | |
| 3,013,548 A | 12/1961 | Thomas | |
| 3,224,218 A | 12/1965 | New | |
| 3,276,634 A | 10/1966 | Arnot | |
| 3,341,081 A | 9/1967 | King | |
| 3,521,704 A | 7/1970 | Bridegum | |
| 3,566,957 A | 3/1971 | Bridegum | |
| 3,645,327 A | 2/1972 | Henley | |
| 4,055,279 A | 10/1977 | Lapera et al. | |
| 4,158,291 A | 6/1979 | Jones | |
| 4,274,390 A | 6/1981 | Azuma | |
| 4,354,548 A | 10/1982 | Carlsson | |
| 4,562,890 A | 1/1986 | Matoba | |
| 4,632,180 A | 12/1986 | Lauderdale | |
| 4,925,092 A | 5/1990 | Yoshida et al. | |
| 5,025,985 A | 6/1991 | Enander | |
| 5,039,007 A | 8/1991 | Wolter | |
| 5,076,494 A | 12/1991 | Ripka | |
| 5,190,025 A | 3/1993 | Chen | |
| 5,226,594 A | 7/1993 | Swenson | |
| 5,233,970 A * | 8/1993 | Harris | 122/14.22 |
| 5,299,329 A | 4/1994 | Constantini | |
| 5,701,387 A | 12/1997 | McGugan | |
| 6,058,012 A * | 5/2000 | Cooper et al. | 361/704 |
| 6,275,655 B1 | 8/2001 | Rixen | |
| 6,332,580 B1 | 12/2001 | Enander et al. | |
| 6,594,447 B2 | 7/2003 | Rixen | |
| 2003/0010835 A1 | 1/2003 | Murgu et al. | |

* cited by examiner

Primary Examiner—Derek S. Boles
(74) Attorney, Agent, or Firm—Kolisch Hartwell, P.C.

(57) ABSTRACT

A heat management system is capable of managing unlimited hydronic heat sources and unlimited heating zones, each located within a desired area and each controlled by temperature sensors. The system uses plural system heating sources to heat a heating solution (preferable glycol-based) that is either heated directly or through a liquid-to-liquid heat exchanger. The heating solution is passed through various plumbing configurations to heat domestic water for users and to heat zones or areas in which user will live. The heat management system of the invention may be used for several applications including RV, marine and home hot water and heating applications.

1 Claim, 13 Drawing Sheets

AC = AC VOLTAGE   HW = HOT WATER AQUASTAT
Th = THERMOSTATS  HS = HEATING SOLUTION AQUASTAT

| DISPLAY REMOTE SW ON | DISPLAY REMOTE SW OFF | AC | Th | HW | HS |
|---|---|---|---|---|---|
| . |  | OFF | OFF | OFF | OFF |
| 0. | 0 | HEATING SOLUTION AT LOW LEVEL | | | |
| 1. | 1 | OFF | OFF | ON | OFF |
| 2. | 2 | OFF | OFF | ON | ON |
| 3. | 3 | ON | OFF | ON | OFF |
| 4. | 4 | ON | OFF | ON | ON |
| 5. | 5 | OFF | ON | OFF | OFF |
| 6. | 6 | OFF | ON | OFF | ON |
| 7. | 7 | ON | ON | OFF | OFF |
| 8. | 8 | ON | ON | OFF | ON |
| 9. | 9 | OFF | ON | ON | ON |
| C. | C | OFF | OFF | OFF | ON |
| E. | E | ON | OFF | OFF | ON |
| c. | c | OFF | ON | ON | OFF |
| ⊐. | ⊐ | ON | ON | ON | OFF |
| U. | U | ON | ON | ON | ON |

FAN 1
FAN 2
FAN 3
FAN 4
S/W
HEATER
WATER PUMP
ENGINE PUMP

REMOTE

NOTE: FLASHING DOT REFLECTS THE FAULT CODES FOR THE HYDRONIC DIESEL FIRED HEATER

MAIN SW

POWER IN 25A
+  −
POWER IN

USER INTERFACE

| F1 | F2 | F3 | F4 | S/W | Tc |
|---|---|---|---|---|---|
| GND | GND | Tc | Tc | Tc | Tc |
| T1 | T2 | T3 | T4 | EP | HW |

SYSTEM INTERFACE

| HW1 | HW2 | S/W | HTR | CP | PE |
|---|---|---|---|---|---|
| GND | GND | Tc | Tc | Tc | Tc |
| BAT | BAT | HS | LEV | AC | HL |

FIG. 13

HEATING SYSTEM

CROSS REFERENCE TO RELATED APPLICATIONS

This application claims priority to U.S. provisional patent application Ser. No. 60/375,123 filed Apr. 22, 2002 for HEATING SYSTEM. The subject matter of the above-identified application is incorporated herein by reference.

TECHNICAL FIELD

The present invention relates generally to heating systems, and more specifically, to a hydronic heating system and method for recreational-vehicle (RV), marine and home heating applications.

BACKGROUND OF THE INVENTION

Heating systems for campers and recreational vehicles are widely known. Conventional water heating systems for RV's generally fall into two classes. The first class includes systems that have a heating element(s) that extends into a cavity that holds several gallons of water. The heating element ultimately heats the entire volume of water in the cavity. Drawbacks to this first class include a lack of continuous hot water. In addition, the first class of systems takes a relatively long period of time to heat water.

The second class involves systems that heat a relatively small volume of water with a gas or electric heating device. Conventional systems of the second class include propane, or other open flame "flash furnace" heating systems that directly heat domestic water supplied to the system. Open-flame systems like these are relatively expensive and relatively unsafe when used in a recreation vehicle. In addition, a propane system is ineffective to provide a constant supply of hot water.

SUMMARY OF THE INVENTION

The invention overcomes the drawbacks of conventional systems by providing a heat management system capable of managing unlimited hydronic heat sources and unlimited heating zones, each located within a desired area and each controlled by temperature sensors (also referred to herein as temperature sensor structure). The invention is designed to work with a single heater (see for example system referenced in FIG. 2 or the system referenced in FIG. 3) or to use plural system heating sources to heat a heating solution (preferable glycol-based). According to the invention, that heating solution is either heated directly or through a liquid-to-liquid heat exchanger. The heating solution is passed through various plumbing configurations (referred to herein as loops and connectable to the system via suitable ports, also referred to as heating-zone port structure) to heat domestic water for users and to heat zones or areas in which user will live. The heat management system of the invention may be used for several applications including recreational-vehicle (RV), marine and home hot-water and heating applications. The heat management system of the invention can be used to replace hot-air or electric heating systems with a hydronic heating system that is constructed for use with one or more hydronic heating sources to heat one or more heating zones.

The heat management system of the invention is constructed to operate with any conventional hydronic heater equipped with an actuator switch for actuating/de-actuating the heater, such as those using natural gas, propane, diesel, gasoline, or electricity as the source of heat.

The system also includes several features that allow the user to be informed about the status of the system and its components, including: (i) an AC-detector to inform the user about the status of an electric back-up heater; (ii) independent controls for each heat source of the system; (iii) a control panel preferably in the form of an LCD display, coupled to the system for remote positioning therefrom, and equipped with actuators necessary for controlling all heat sources of the system; (iv) a text-display capability for displaying at the control panel messages informing the user about the status of components of the system including the heating sources, temperature of the heating solution (preferably glycol), the temperature of hot water, and status of the fans located in areas desired to be heated such as cabins of a recreational vehicle; and (v) refill and service warning indicators displayable at the control panel to inform the user if one of the system fluids needs to be refilled or if the system requires service (based upon preselected criteria such as passage of time, fault detection of a system component(s).

Additional status-communication features include: (i) display of fault codes associated with a diesel-fired heater of the system both as a flashing LED display coupled to the actuator of that heater, and a textual message displayable simultaneously on the control panel; (ii) fluid-level sensors that monitor the fluid level of the heating solution contained in an expansion tank and provide information to control circuitry of the system to stop all system heating sources if the fluid level of the heating solution falls below a preselected threshold.

The system also includes several programmable features preferably achieved using software so that each can be adjusted without requiring new hardware, and those features include: (i) a water-heating cycling feature that maximizes the capability and efficiency of the system heat sources by using plural heating solution temperature ranges for automatic actuation/de-actuation of each system heat source depending upon whether the user demands domestic hot water (e.g. system heat source(s) are actuated if water temperature falls below 150° F. and de-actuated if heating solution temperature reaches 180° F.) or area heating (without demand for domestic hot water) (e.g. system heat source(s) are actuated if heating solution temperature falls below 120° F. and de-actuated if heating solution temperature reaches 180° F.), (ii) a heat source priority controller governing situations when different ones of the heating sources of the system are actuated depending upon preselected factors such as heating source availability, user-demand requirements, etc.; (iii) an engine preheat loop that allows bi-directional heat transfer from and to the engine to allow for various engine situations such as vehicle-engine applications (RV and marine) as well as home-heating engine applications affording the capability to deice a driveway; (iv) a time-based de-actuator feature that disables an engine-preheat pump after a preset period of time to avoid undesired drainage of associated engine batteries and excessive wear of the pump A control board (also referred to herein as control structure) of the system is constructed to direct the flow of the heating solution through plural preselected loops such as a short loop supporting demand for hot domestic water but not heat (summer applications) and a long loop supporting demand for both hot domestic water and heat (winter applications). The control board is also constructed to optimize heating efficiency and cost by having the capability of sensing whether any thermostat of the system becomes active, and responding to such sensing by activating a by-pass solenoid (that may be plural-way including two- or three-way) that allows the heating solution to circulate through the long loop.

The control board is also programmable for automatic actuation/de-actuation of heating-area fans (such as cabin fans) when system heating solution temperature is over preselected minimum such as 110° F. (actuation) or under a preselected maximum such as 110° F. (de-actuation), circulating water pumps, and for by-pass of the long loop solenoid if heat is unavailable. The system includes a set of temperature sensors that allow the control board to determine when heat is available from system heat sources and to determine when the cabin fans, circulating water pumps and by-pass solenoids are deactivated or activated.

The system of the invention also includes several components related to making the overall heating process effective and efficient. To transfer heat from the heating solution to the domestic hot water, the system includes heat exchanger structure such as a double-wall plate heat exchanger is used. To maximize heat transfer, all heat exchangers of the invention are designed so that the heating solution and domestic hot water flow in opposite directions referred to herein as opposite-flow design. To use the system for heating zones at maximize efficiency, the hot-water heat exchanger of the system is installed first in the series loop of the system heating zones so that the heat exchanger has access to the hottest possible heating solution. The temperature sensor for hot water is preferably installed on the hot-water heat exchanger a preselected distance (preferably about 1-inch) from the cold water intake port of the heat exchanger. To maintain efficient heat transfer, single-wall plate heat exchangers are used with all system heat sources that are not constructed to provide direct heat to the heating solution. To preheat domestic cold water, a solar panel can be incorporated in the system (see FIG. 9). When there is limited space for installing the system and to simplify plumbing installation, the invention is equipped with a component that provides a combination of double-wall and single-wall heat exchangers in a single unit (see FIGS. 7-8).

The system of the invention is also designed for retrofitting an existing residential-home, hot-water heater into a hydronic heating system that provides users with hot water on-demand and hydronic heat. That retrofitting process includes disconnecting the existing residential home plumbing from the existing hot water heater and reconnecting it to the domestic water ports of the system of the invention. Then the existing hot-water heater is filled with a suitable glycol heating solution, and the glycol-filled, hot-water heater is connected to the corresponding heater ports of the system. Plumbing conductors (preferably hoses) of the system are positioned in the existing hot-air ducts of the residential home, and the rooms of the residential home (heating zones) are connected by connecting the plumbing conductors into a series or parallel circuit depending upon user needs. One circulation pump is used for an application requiring a series circuit, and plural pumps with an associated manifold and bypass solenoids are used for an application requiring a parallel circuit. The newly-installed room thermostats and room fans are then connected to the control board of the system of the invention.

The system of the invention is also designed to replace electric hot-water heater systems such as those used for marine applications where that heater is part of a standard installation but where future upgrades to hydronic heating are difficult due to space limitations and conventional heater system design. The system (further described below in connection with FIG. 4) includes a heating-solution expansion tank filled with a heating solution such as glycol to a preselected maximum level and a water pump for pumping water through the system. The system is constructed to de-actuate the electric heater and the water pump when it senses that the heating solution is below a preselected minimum level. If the heating-solution level remains in a preselected range, then the water pump is automatically actuated to provide hot water on demand as long as the heating-solution temperature exceeds 120° F. and the temperature of the hot water is under 150° F. The system automatically de-actuates the water pump if there is no heat available (i.e. the system senses that the temperature of the heating solution is below 120° F.) or the temperature of the hot water exceeds 150° F.

This version of the system of the invention provides several advantages over conventional electric hot-water heater systems, including: (i) easy to expand to other versions of the system of the invention (such as those shown in FIGS. 1-2); (ii) eliminates corrosion and electrolysis problems associated with conventional systems; (iii) easier to protect against freezing conditions due to the use of a glycol-based heating solution with a lower freezing point than water; (iv) eliminates bacteria build-up that occurs in conventional hot-water holding tanks (such as with conventional flash heating systems); (v) increased system efficiency and as a result more economic than conventional systems; (v) the plate heat exchanger of the invention is 95% efficient (95% of the amount of heat stored in the heating solution is transferred to the hot water) due to its construction with the opposite-flow design.

Another way to characterize the invention is as a hydronic heating and hot water system that provides hot water to the user on-demand without requiring a storage tank for holding desired hot water.

Another way to characterize the invention is as a hydronic water heating system that uses a heated fluid storage tank to deliver a continuous supply of water heated to a desired temperature, such as between 100°-130° F. The system also may combine a heated fluid storage tank with a burner-type furnace to provide multiple sources of hydronic heat for RV and other appropriate applications. An anti-scald mixing valve is installed on the hot water circuit to limit the maximum temperature of the water coming out the system to 130° F. As shown in FIG. 6, the system may also be equipped with a check valve that eliminates the possibility that potable water stored in the holding tanks of the RV or boat could be drained by other pumping systems connected to the same water supply line.

BRIEF DESCRIPTION OF THE DRAWINGS

FIG. 13 is a representative schematic wiring diagram of the system of the invention for RV applications.

DETAILED DESCRIPTION AND BEST MODE OF THE INVENTION

Figure 1:
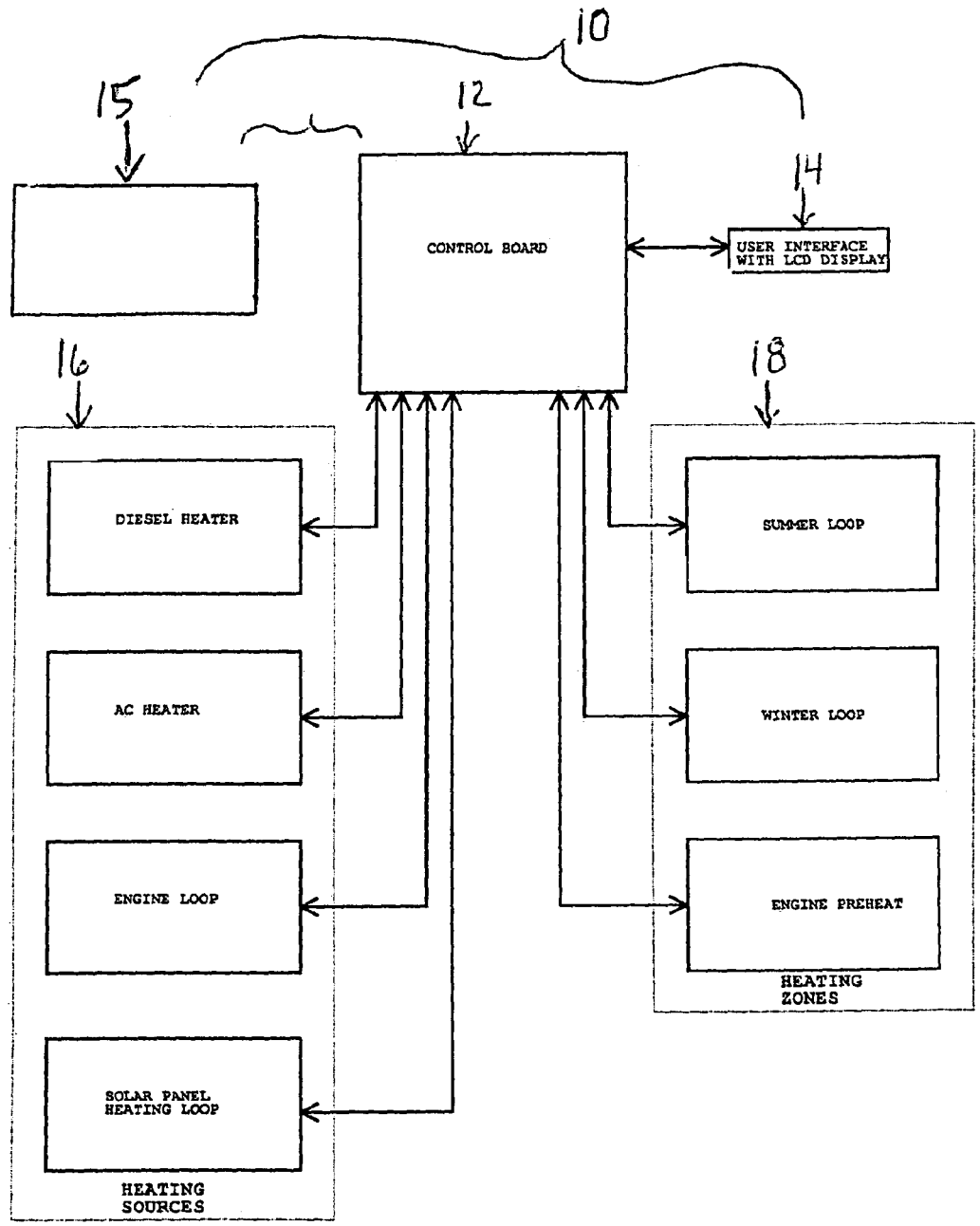
FIG. 1 is a schematic flow diagram of a heating system according to one embodiment of the present invention.
Figure 11:
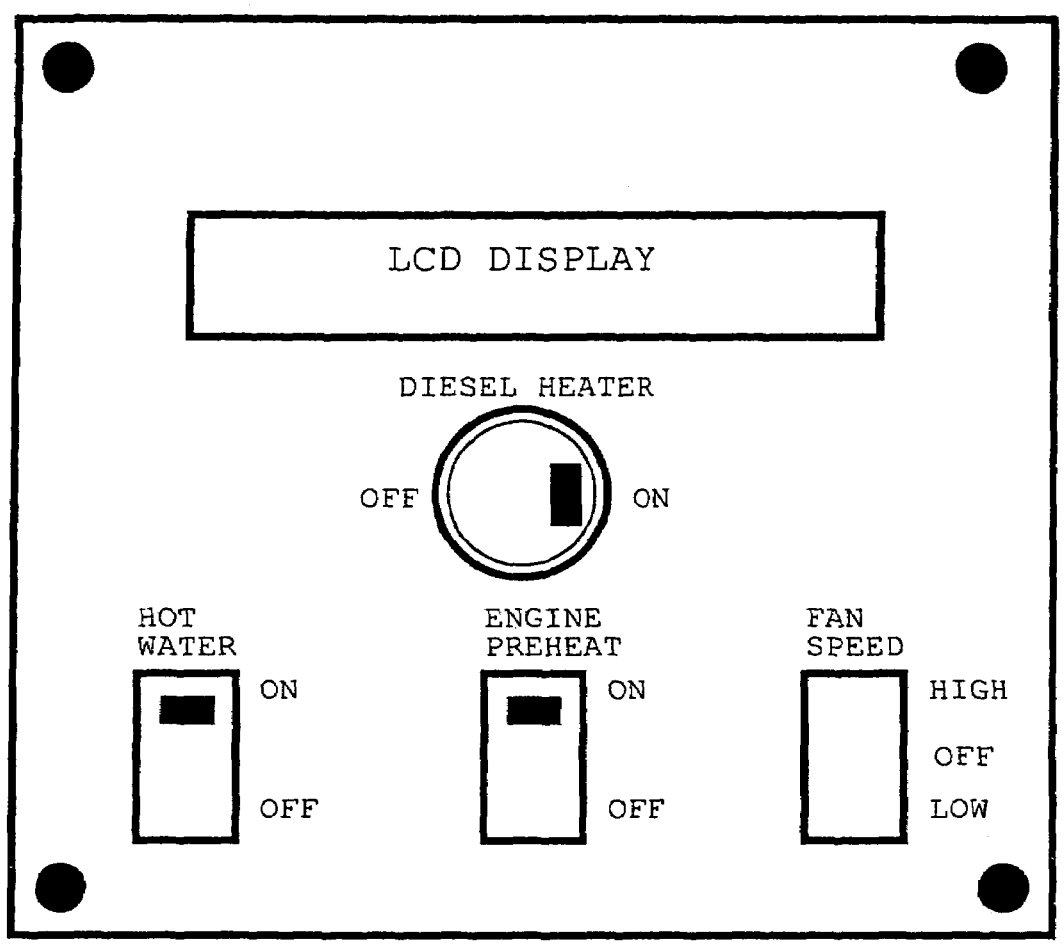
FIG. 11 is a schematic diagram showing one version of the control panel/LCD display component of the system wherein there are plural electric heaters and one diesel heater.
Figure 12:
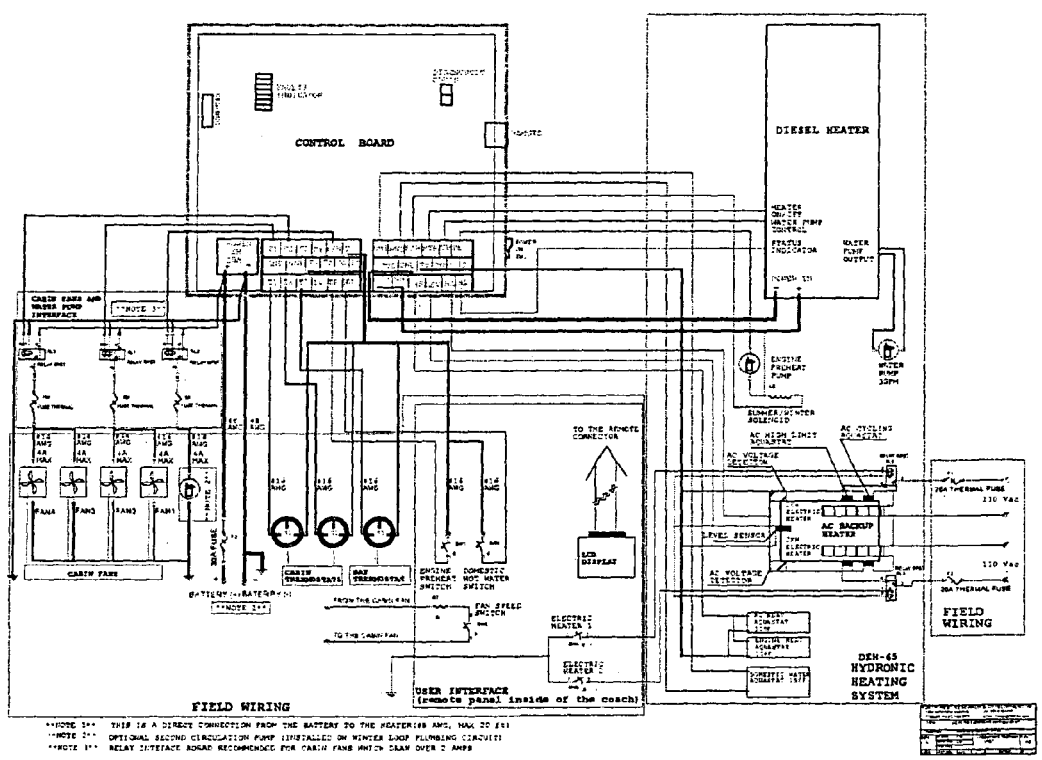
FIG. 12 is a schematic diagram showing another version of the control panel/LCD display component of the system wherein is a single diesel heater.

Referring to FIG. 1, the system of the invention is shown at 10 and includes a control structure or board 12 (with undepicted, suitable, associated control circuitry) in bi-directional electrical/electronic communication with a user interface 14 (also referred to herein as a control panel which preferably takes the form of an LCD display that will be described further in connection with FIGS. 11-12); and in fluid/plumbing communication with stand-alone subsystem (SLS) 15. Control board 12 is also in bi-directional electrical/electronic communication with one or more heating sources 16, and with one or more heating zones 18.

Figure 2:
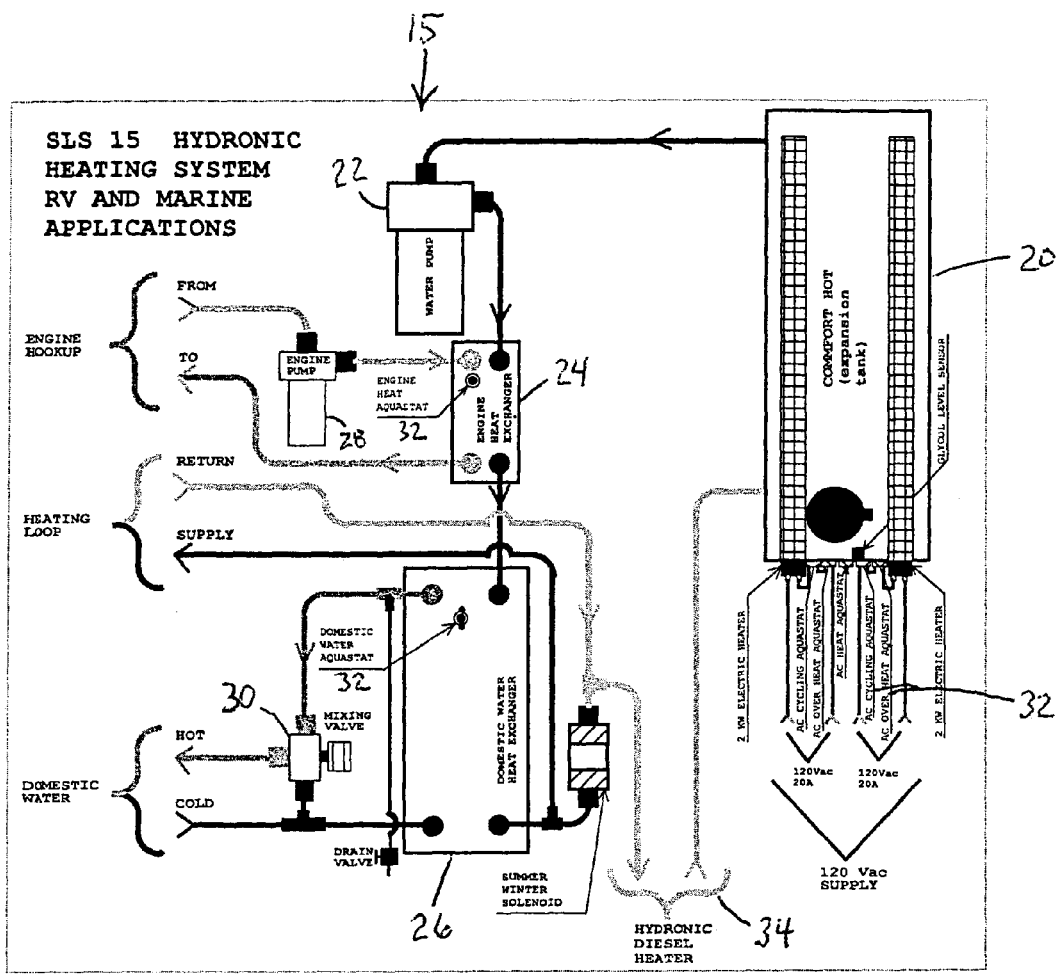
FIG. 2 is a schematic flow diagram of the system of the invention for RV and marine applications.
Figure 3:
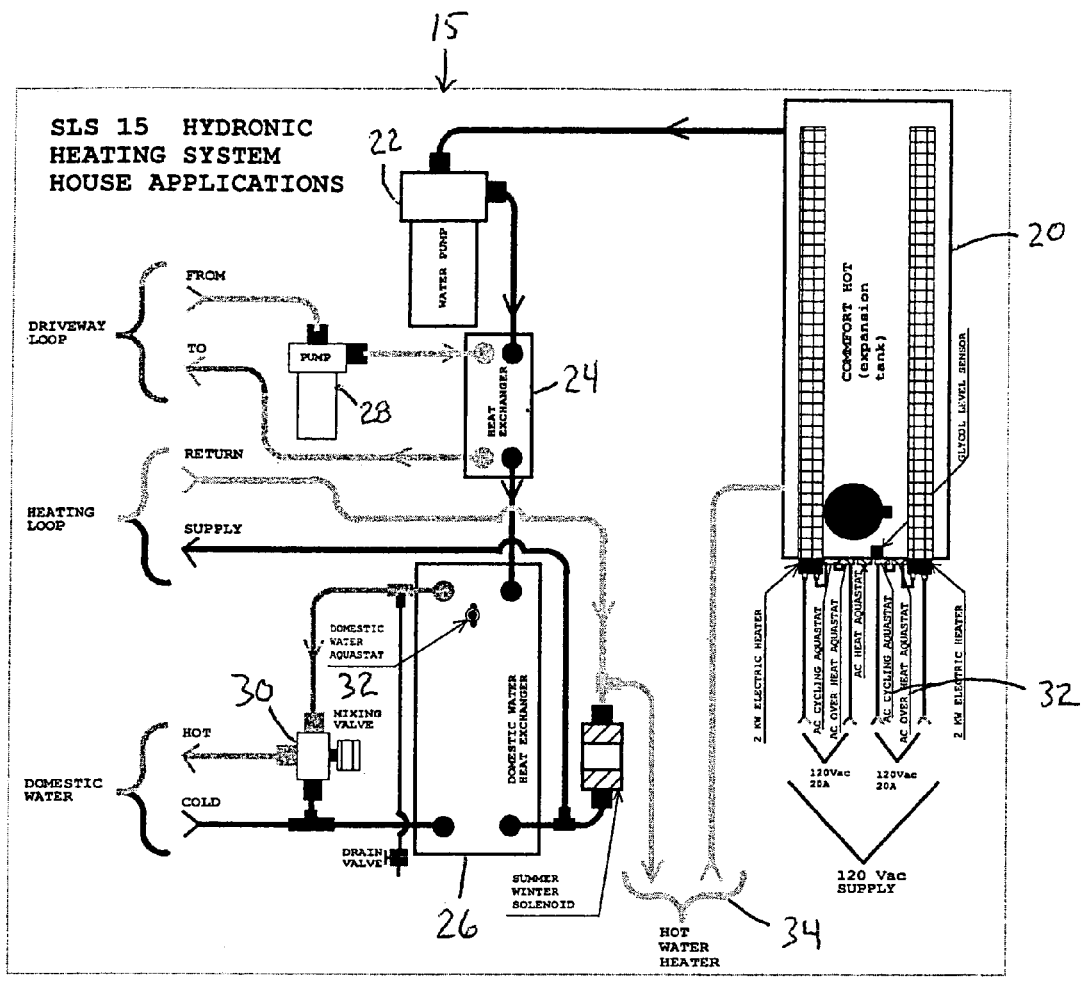
FIG. 3 is a schematic flow diagram of the system of the invention for residential-home applications.
Figure 6:
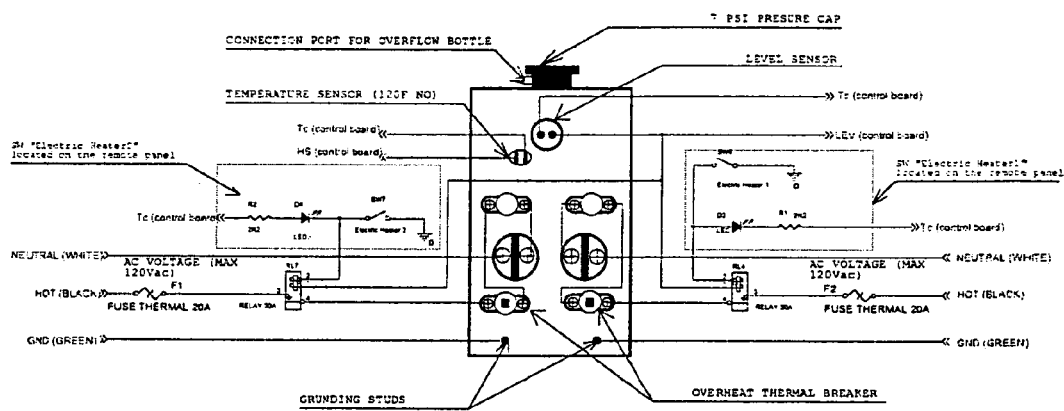
FIG. 6 is a schematic diagram of the hydronic heating subsystem for use in an RV application.

As shown best in FIGS. 2-3, each of which depict components that are coupled via fluid/plumbing connection, subsystem 15 includes a heating-solution, storage-expansion tank 20 filled with a suitable heating solution (undepicted) such as a commercial grade glycol, a water pump 22, an engine heat exchanger 24, a domestic water heat exchanger 26, a fluid pump 28 (for vehicle engine fluid in FIG. 2 and for driveway heating fluid in FIG. 3) and a mixing valve 30. Suitable temperature sensors (known commercially as aquastats or snap disk thermostats) 32 provide fluid-temperature information to control board 12 (FIG. 1) to allow the control board to make the decisions described in the above summary and in the description below. Valve 30 is preferably an anti-scald mixing valve that limits the maximum temperature of the hot water coming out the system to 130° F. As shown in FIG. 6, the system may also be equipped with a check valve that eliminates the possibility that potable water stored in the holding tanks of the RV or boat could be drained by other pumping systems connected to the same water supply line.

Subsystem 15 may be provided with one or more ports 34 that allow external heating sources to be connected to the subsystem to provide supplemental heat to heat the heating solution. Referring back to FIG. 1, those external heat sources may be any conventional hydronic heating source such as a diesel heater, electric (AC) heater, a vehicle engine, or a solar panel.

Referring again to FIGS. 2-3, the subsystem 15 includes suitable, dual electric heaters (such as ones that produce 15,000 BTU/hour) and the subsystem is coupled to control board 12 (FIG. 1) with suitable control circuitry to actuate each of them. When actuated, the electric heaters are capable of heating the heating solution contained in tank 20. The subcomponents of the system that include the dual heaters and storage tank with heating solution is sold under the trademark COMFORTHOT™ by Rixens Enterprises of Portland, Oreg. For the depicted version of the system, a volume of four gallons of a commercial grade glycol is acceptable.

When the temperature sensor installed on the tank detects that the heating solution has reached 110° F.-120° F., it sends a signal to the control board informing it that heat is available and usable. If one of the heating zones 18 (FIG. 1) becomes active (i.e. the user actuates the switch for heat in that one zone), the control board activates the heating-solution circulation pump, and the cabin fan or by-pass solenoid associated with the activated heating zone to allow the transfer of heat from the heating solution to the activated zone. If the heat provided by the dual electric heaters is not in sufficient supply based upon a to-be-described algorithm, the control board activates other hydronic heat sources available to the system (see box 16 of FIG. 1). For example, the system may have access via suitable heater ports to various supplemental conventional hydronic heaters such as a diesel-fired heater, hot-water heaters, etc.

There is bi-directional communication between the control board and the system heating sources via the actuators of each heating source. Each temperature sensor is mounted adjacent the region of the system where heat from the heating source is transferred to the heating solution. Information from all system temperature sensors provides the control board with necessary input about the existence of heat into the system. To ensure that the information is available to the control board, it is constructed to continuously scan associated temperature sensors of the system heating zones temperature sensors to determine when a given zone is active.

Figure 5:
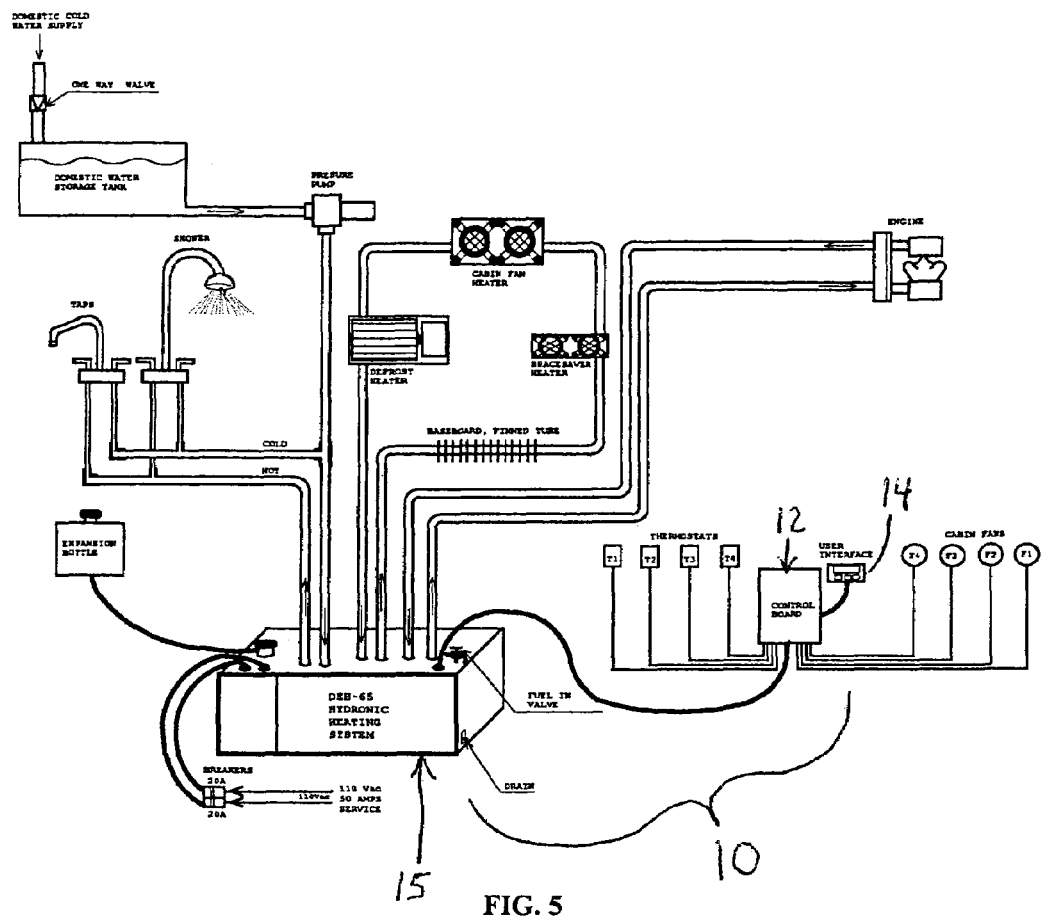
FIG. 5 is a schematic diagram of the hydronic heating subsystem used in the invention.

Once the two conditions are met (the control board learns that heat is available and the user requests heat by actuating a heat zone), the control board activates the heating-solution circulation pump which pumps the heating solution through preselected loops of the system because the system includes a series heating loop. However, the transfer of heat from the heating solution will take place only where the heating zone(s) has been actuated by the user. The heat transfer is done using a combination of one or more of the following: liquid-to-liquid heat exchangers, cabin fans, or by-pass solenoids in conjunction with fine tubes (see FIGS. 5-6).

One of the biggest advantages of the invention is that the control board makes possible the integration of an unlimited number of hydronic heating sources without restriction on size or shape. The four shown in FIG. 1 at 16 are only representative of the unlimited number of heating sources (and also unlimited number of heating zones 18) that can be coupled to system 10.

Figure 4:
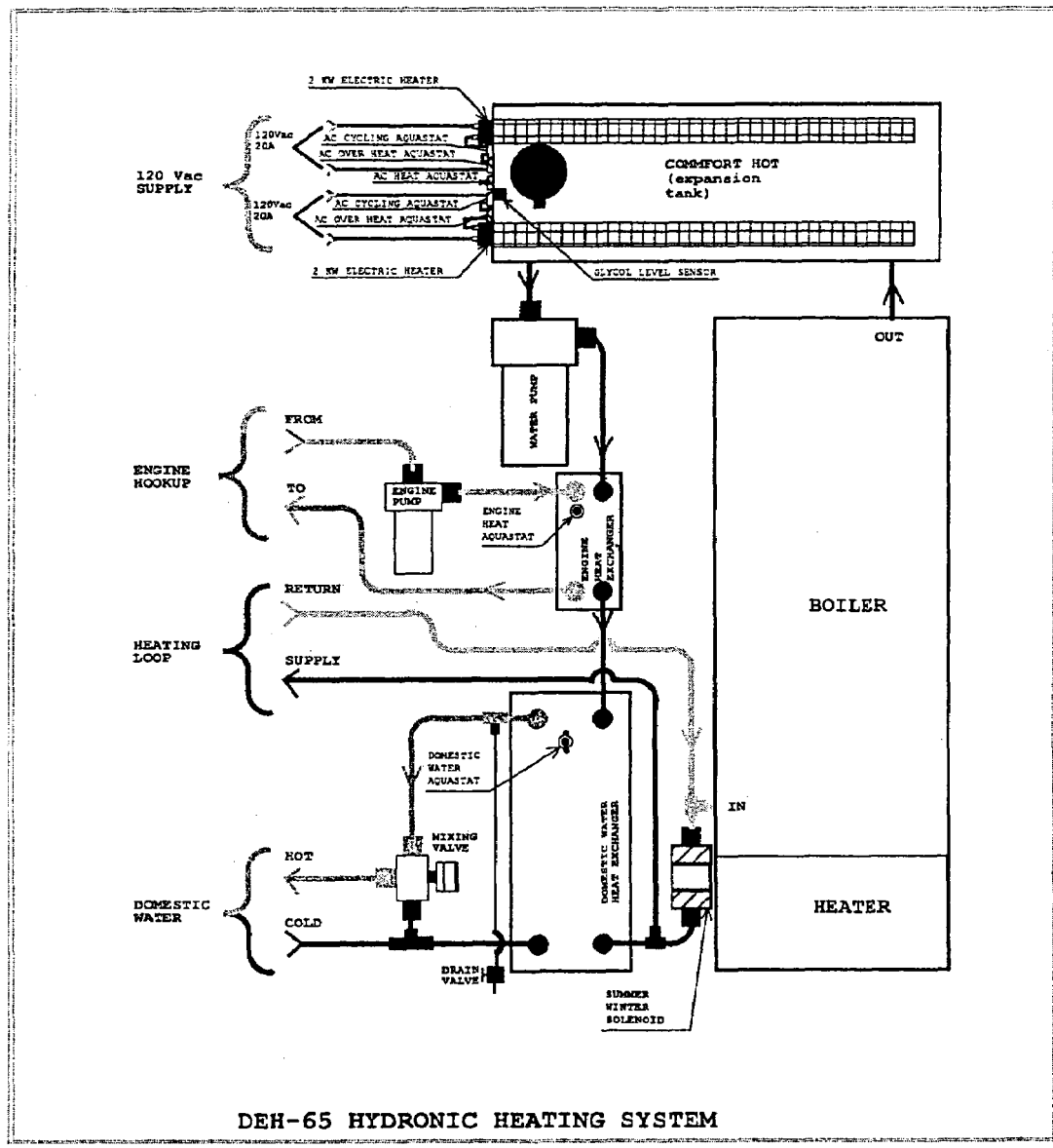
FIG. 4 is a schematic flow diagram of the system of the invention for a marine application that replaces conventional electric hot-water heater systems.

Referring to FIG. 4, a version of system 10 is shown that is designed to replace electric hot-water heater systems such as those used for marine applications. Those types of conventional heater systems are part of a standard marine installation where future upgrades to hydronic heating are difficult due to space limitations and conventional heater system design. The system shown in FIG. 4 includes heating-solution expansion tank 20 filled with a heating solution such as glycol to a preselected maximum level and a water pump 22 for pumping water/fluid through the system. The system is constructed to de-actuate the electric heater and the water pump when it senses that the heating solution is below a preselected minimum level. If the heating-solution level remains in a preselected range, then the water pump is automatically actuated to provide hot water on demand as long as the heating-solution temperature exceeds 120° F. and the temperature of the hot water is under 150° F. The system automatically de-actuates the water pump if there is no heat available (i.e. the system senses that the temperature of the heating solution is below 120° F.) or the temperature of the hot water exceeds 150° F.

This version of the system of the invention provides several advantages over conventional electric hot-water heater systems, including: (i) easy to expand to other versions of the system of the invention (such as those shown in FIGS. 1-2); (ii) eliminates corrosion and electrolysis problems associated with conventional systems; (iii) easier to protect against freezing conditions due to the use of a glycol-based heating solution with a lower freezing point than water; (iv) eliminates bacteria build-up that occurs in conventional hot-water holding tanks (such as with conventional flash heating systems); (iv) increased system efficiency and as a result more economic than conventional systems; (v) the plate heat exchanger of the invention is 95% efficient (95% of the amount of heat stored in the heating solution is transferred to the hot water) due to its construction with the opposite-flow design.

Referring to FIGS. 1-3 and 5-6, the system also includes several programmable features preferably achieved using software so that each can be adjusted without requiring new hardware, and those features include: (i) a water-heating cycling feature that maximizes the capability and efficiency of the system heat sources by using plural heating solution temperature ranges for automatic actuation/de-actuation of each system heat source depending upon whether the user demands domestic hot water (e.g. system heat source(s) are actuated if water temperature falls below 150° F. and de-actuated if heating solution temperature reaches 180° F.) or area heating (without demand for domestic hot water) (e.g. system heat source(s) are actuated if heating solution temperature falls below 120° F. and de-actuated if heating solution temperature reaches 180° F.), (ii) a heat source priority controller governing situations when different ones of the heating sources of the system are actuated depending upon pre-selected factors such as heating source availability, user-demand requirements, etc.; (iii) an engine preheat loop that allows bi-directional heat transfer from and to the engine to allow for various engine situations such as vehicle-engine applications (RV and marine) as well as home-heating engine applications affording the capability to deice a driveway; (iv) a time-based de-actuator feature that disables an engine-preheat pump after a preset period of time to avoid undesired drainage of associated engine batteries and excessive wear of the pump Referring to FIGS. 1, 5 and 10-13, control board 12 is constructed to direct the flow of the heating solution through plural preselected loops such as a short loop supporting demand for hot domestic water but not heat (summer applications) and a long loop supporting demand for both hot domestic water and heat (winter applications). The control board is also constructed to optimize heating efficiency and cost by having the capability of sensing whether any thermostat of the system becomes active, and responding to such sensing by activating a by-pass solenoid (that may be plural-way including two- or three-way) that allows the heating solution to circulate through the long loop.

Control board 12 is also programmable for automatic actuation/de-actuation of heating-area fans (such as cabin fans shown in FIGS. 5 and 12) when system heating solution temperature is over preselected minimum such as 110° F. (actuation) or under a preselected maximum such as 110° F. (de-actuation), circulating water pumps, and for by-pass of the long loop solenoid if heat is unavailable. The system includes a set of temperature sensors that allow the control board to determine when heat is available from system heat sources and to determine when the cabin fans, circulating water pumps and by-pass solenoids are deactivated or activated.

Figure 7:
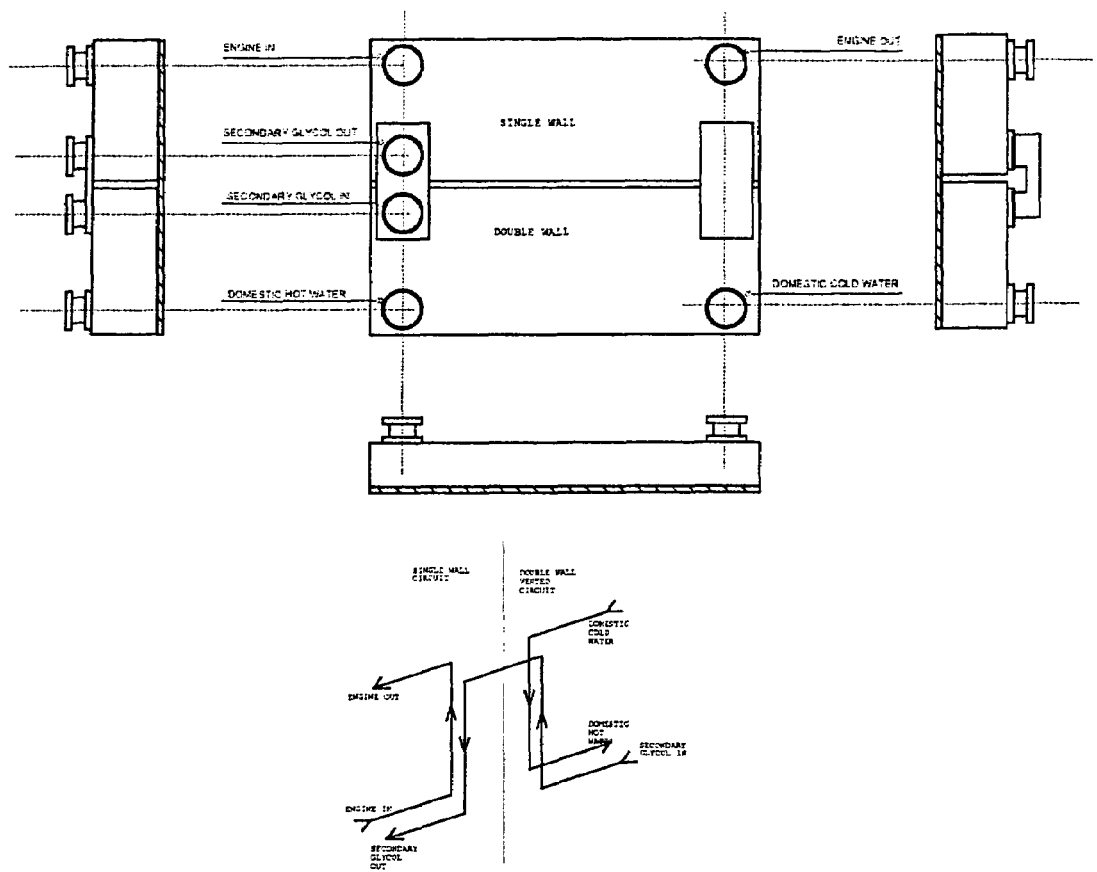
FIG. 7 is an end-view schematic diagram of a hot-water heater expansion tank showing pertinent connections to other system components.
Figure 8:
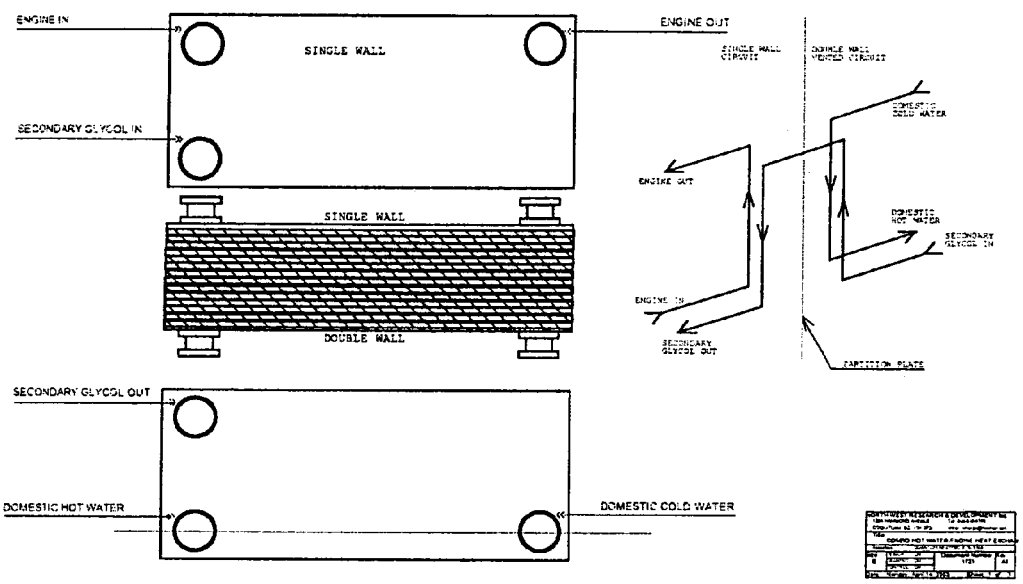
FIG. 8 shows a schematic diagram of heat exchanger structure of the system with single-wall and double-wall heat exchanging functions and a fluid-flow diagram illustrating opposite flow of the heating solution and domestic hot water to maximize heat transfer.

Referring to FIGS. 7-8, the heat exchangers of system 10 are shown in detail. It should also be noted that the following disclosures are incorporated herein by reference: U.S. patent application Ser. Nos. 10/206,890 and 10/055,268, both of James M. Rixen for a HEATING SYSTEM FOR POTABLE WATER AND RELATIVELY SMALL AREAS, and U.S. Pat. No. 6,275,655 B1 of James M. Rixen for a HEATING SYSTEM FOR POTABLE WATER AND RELATIVELY SMALL AREAS. The heat exchangers of the invention are designed with several features that make the overall heating process effective and efficient. To transfer heat from the heating solution to the domestic hot water, a suitable double-wall plate heat exchanger is used. To maximize heat transfer, all heat exchangers of the invention are designed so that the heating solution and domestic hot water flow in opposite directions referred to herein as opposite-flow design. To use the system for heating zones at maximize efficiency, the hot-water heat exchanger of the system is installed first in the series loop of the system heating zones so that the heat exchanger has access to the hottest possible heating solution. The temperature sensor for hot water is preferably installed on the hot-water heat exchanger a preselected distance (preferably about 1-inch) from the cold water intake port of the heat exchanger. To maintain efficient heat transfer, single-wall plate heat exchangers are used with all system heat sources that are not constructed to provide direct heat to the heating solution. To preheat domestic cold water, a solar panel can be used. When there is limited space for installing the system and to simplify plumbing installation, the invention is equipped with a component that provides a combination of double-wall and single-wall heat exchangers in a single unit (see FIGS. 7-8).

Figure 9:
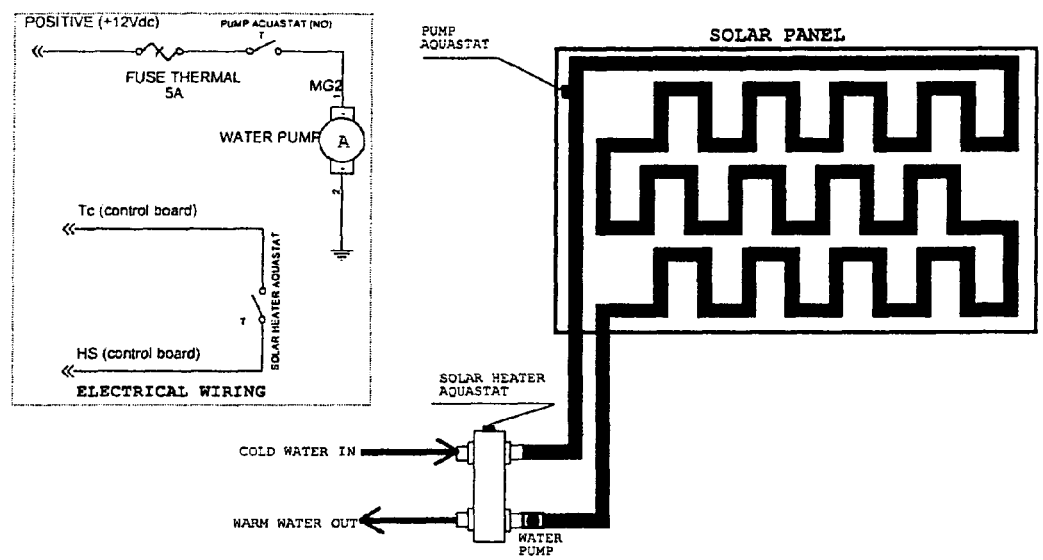
FIG. 9 shows a schematic diagram of heat exchanger structure that provides a combination of single-wall and double-wall heat exchangers and a fluid-flow diagram illustrating opposite flow of the heating solution and domestic hot water to maximize heat transfer.
Figure 10:
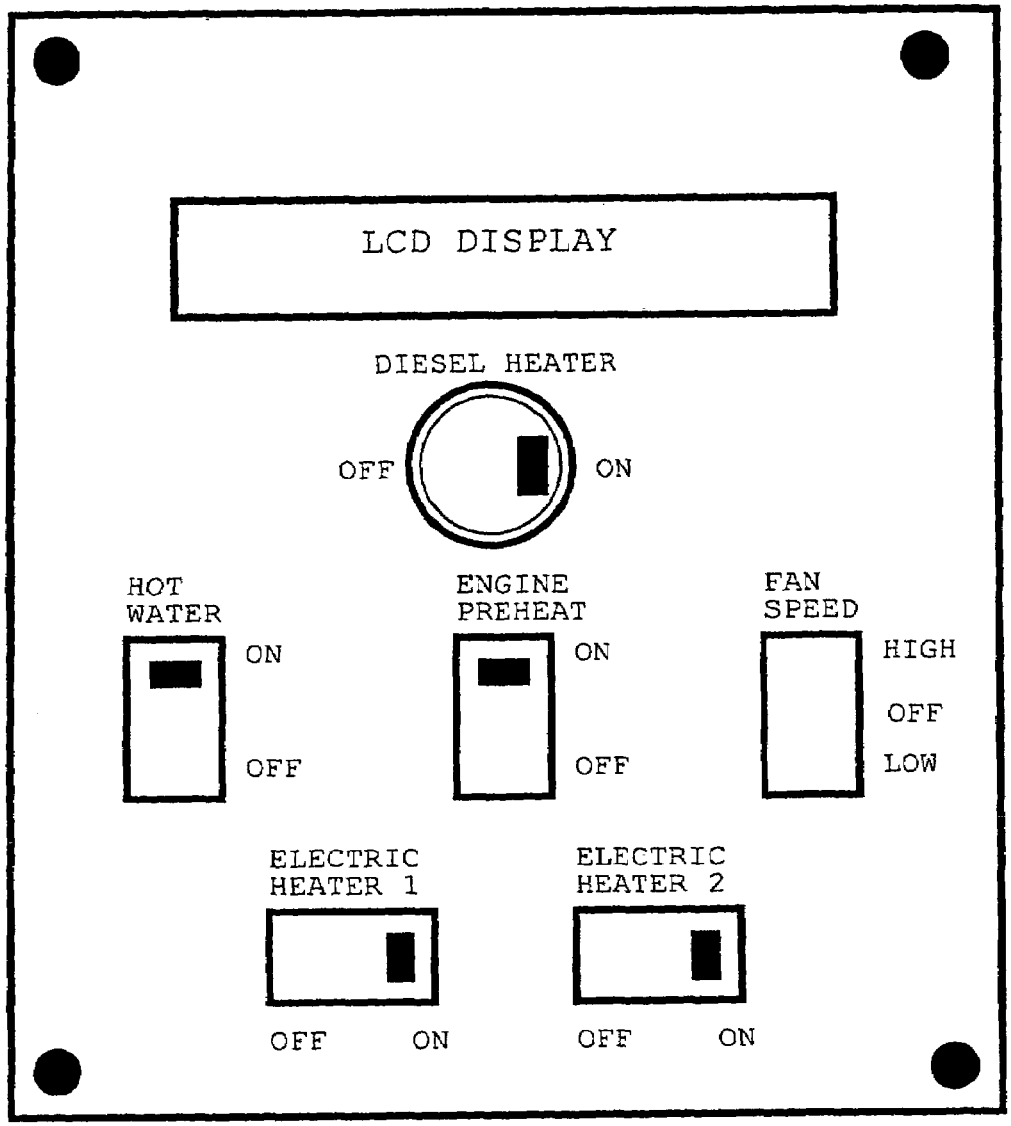
FIG. 10 is a schematic diagram of a water preheating subsystem of the invention shown in its preferred solar-panel heating form.

Referring to FIGS. 1 and 9, the solar panel heating source is shown, and is usable to pre-heat cold domestic water before it is used by system 10, thereby further increasing the efficiency of the system.

The disclosure set forth above encompasses multiple distinct inventions with independent utility. While each of these inventions has been disclosed in its preferred form, the specific embodiments thereof, as disclosed and illustrated herein, are not to be considered in a limiting sense as numerous variations are possible. The subject matter of the inventions includes all novel and non-obvious combinations and sub-combinations of the various elements, features, functions and/or properties disclosed herein.

We claim:

1. A hydronic heat management system usable to heat a supply of domestic water, comprising:
   a supply of heating solution;
   a heatable container for the heating solution;
   a pump for directing flow of the heating solution;
   a domestic water port for receiving water from the supply of domestic water;
   heat exchanger structure with plural regions that accommodate for the flow of heating solution through one region and domestic water through another, and being constructed to direct flow of the heating solution in a direction opposite to that of the domestic water;

at least one heating loop that is effective to provide heat to a heating zone;

heating-zone port structure for connecting to the at least one heating loop;

temperature sensor structure located adjacent the heatable container, the heat exchanger structure and the port structure;

control structure in bi-directional communication with the system and constructed to actuate the pump and the heatable container to heat the heating solution based upon whether the temperature of the heating solution is above a preselected threshold, and wherein the control structure is in communication with a user interface that allows the user to be informed about the status of the system;

plural heating loops and plural ports for connecting to the plural heating loops to heat plural heating zones;

plural hydronic heating sources to supply supplemental heat to the heated container;

a short heating loop and a long heating loop; and wherein the control structure is constructed to direct the flow of the heating solution through the short loop supporting demand for hot domestic water but not heat, and through a long loop supporting demand for both hot domestic water and heat.

* * * * *